United States Patent
Li et al.

(10) Patent No.: US 10,432,468 B2
(45) Date of Patent: Oct. 1, 2019

(54) NOTIFICATION POLICIES

(71) Applicant: Facebook, Inc., Menlo Park, CA (US)

(72) Inventors: Yiting Li, Milpitas, CA (US); Chao Teng, Menlo Park, CA (US); Yiyu Li, Mountain View, CA (US); Zhengxiao Cao, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 32 days.

(21) Appl. No.: 15/492,991

(22) Filed: Apr. 20, 2017

(65) Prior Publication Data
US 2018/0309631 A1 Oct. 25, 2018

(51) Int. Cl.
*G06F 15/173* (2006.01)
*H04L 12/24* (2006.01)
*H04L 12/58* (2006.01)
*H04L 29/08* (2006.01)
*H04W 4/12* (2009.01)

(52) U.S. Cl.
CPC ...... *H04L 41/0893* (2013.01); *H04L 41/0686* (2013.01); *H04L 51/00* (2013.01); *H04L 67/26* (2013.01); *H04W 4/12* (2013.01); *H04L 67/02* (2013.01)

(58) Field of Classification Search
CPC .............................. G06F 21/57; H04L 67/025
USPC .................................................. 709/223, 225
See application file for complete search history.

(56) References Cited

U.S. PATENT DOCUMENTS

| | | | | |
|---|---|---|---|---|
| 7,177,859 | B2* | 2/2007 | Pather | G06F 9/542 |
| 7,251,696 | B1* | 7/2007 | Horvitz | G06Q 10/107 |
| | | | | 379/114.01 |
| 7,953,846 | B1* | 5/2011 | Amoroso | G06F 21/57 |
| | | | | 709/219 |
| 2004/0254985 | A1* | 12/2004 | Horstemeyer | B60R 25/102 |
| | | | | 709/205 |
| 2007/0005754 | A1* | 1/2007 | Horvitz | H04L 12/1813 |
| | | | | 709/224 |
| 2012/0259962 | A1* | 10/2012 | Bose | H04L 41/50 |
| | | | | 709/223 |
| 2013/0325948 | A1* | 12/2013 | Chen | G06Q 50/01 |
| | | | | 709/204 |
| 2017/0078860 | A1* | 3/2017 | Fix | H04W 4/90 |

* cited by examiner

*Primary Examiner* — Phuoc H Nguyen
(74) *Attorney, Agent, or Firm* — Baker Botts L.L.P.

(57) ABSTRACT

In one embodiment, a method includes receiving an indication of an occurrence of a triggering event for one or more notifications relevant to one or more users. The notifications are sent to one or more of the users through one or more of a number of notifications channels, and each notification channel is associated with one or more software applications. The method also includes accessing a number of notification policies associated with the software applications. Each of the software applications has at least one associated notification policy. At least one of the notification policies associated with a first one of the software applications is interrelated with at least one other notification policy associated with a second one of the software applications. The method also includes sending one or more notifications to one or more users through one or more of the number of notification channels.

20 Claims, 7 Drawing Sheets

NOTIFICATION POLICIES

TECHNICAL FIELD

This disclosure generally relates to sending notifications.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments describe a framework for providing notifications to one or more client devices. Notifications may be used to enhance specific user experiences such as sending reminders for appointments, engaging specific customers (e.g. inactive customers) with promotional offers, etc. A notifications workflow may be initiated by a triggering event (e.g., activity on a social-networking system with regard to the user) causing notifications to be sent to one or more recipients (e.g., the user or friends of the user). For each recipient, there may be multiple notifications to provide and each notification may be sent to different channels having a unique endpoint. Each layer or component of the notification workflow (e.g., trigger, recipient, or notification type) may have one or more associated notification policies with a respective threshold.

A notification providing architecture may include a policy engine that executes the notification policies. The policy engine may receive an indication of an occurrence of a triggering event for notifications relevant to one or more users. The notifications may be sent to the users through a number of notification channels. Examples of notification channels may include short-messaging service (SMS), multimedia-messaging service (MMS), e-mail, or voice call notification. In particular embodiments, one or more of the notification channels are associated with one or more software applications (e.g., messaging or voice over IP (VOIP) applications).

In particular embodiments, the notification policies associated with the software applications may be accessed. Each of the software applications may have at least one associated notification policy, and at least one of the notification policies associated with a particular software application may be interrelated with at least one other notification policy associated with another software application. The notification providing architecture may send one or more notifications to users through one or more of the notification channels based at least in part on the output of one or more interrelated notification policies.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments describe a framework for providing notifications to one or more client devices. Notifications may be used to enhance specific user experiences such as sending reminders for appointments, engaging specific customers (e.g. inactive customers) with promotional offers, etc. A notifications workflow may be initiated by a triggering event (e.g., activity on a social-networking system with regard to the user) causing notifications to be sent to one or more recipients (e.g., the user or friends of the user). For each recipient, there may be multiple notifications to provide and each notification may be sent to different channels having a unique endpoint. Each layer or component of the notification workflow (e.g., trigger, recipient, or notification type) may have one or more associated notification policies with a respective threshold.

The notification providing architecture may include a policy engine that executes the notification policies. The policy engine may receive an indication of an occurrence of a triggering event for notifications relevant to one or more users. The notifications may be sent to the users through a number of notification channels. Examples of notification channels may include short-messaging service (SMS), multimedia-messaging service (MMS), e-mail, or voice call notification. In particular embodiments, one or more of the notification channels are associated with one or more software applications (e.g., messaging or voice over IP (VOIP) applications).

In particular embodiments, notification policies associated with the software applications may be accessed. Each of the software applications may have at least one associated notification policy, and at least one of the notification policies associated with a particular software application may be interrelated with at least one other notification policy associated with another software application. The notification providing architecture may send one or more notifications to users through one or more of the notification channels based at least in part on the output of one or more interrelated notification policies.

Figure 1:
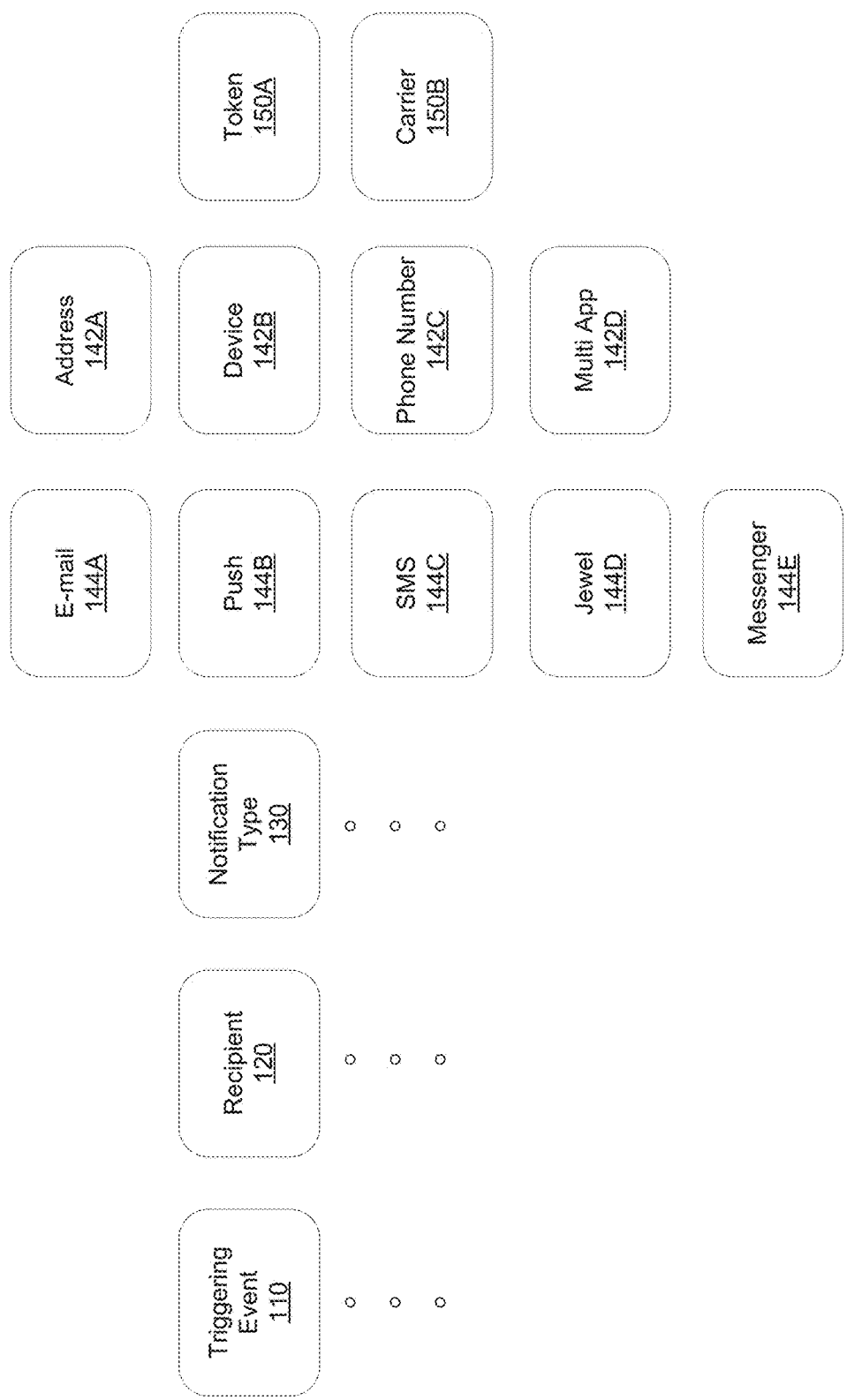
FIG. 1 illustrates an example notification flow for delivering notifications to a user.

FIG. 1 illustrates an example notification flow for delivering notifications to a user. The notification flow may include a number of "layers" that correspond to different components of the notification flow (e.g., trigger 110, recipient 120, or notification type 130). Each "layer" of the notification workflow may have one or more associated policies with a respective threshold, as described below. In particular embodiments, triggering events 110 may include any suitable activity or event associated with a user on any suitable system. Triggering event 110 for some notifications may be "organic" events (e.g., someone commenting on a post on a particular system), while other notifications ("campaign") may be triggered by offline services (e.g., triggered by logic of the particular system) to encourage users to engage with a particular system. As an example and not by way of limitation, triggering event 110 may be an upcoming birthday of a user or a user posting a photo on a photo-sharing site. As another example and not by way of limitation, a particular system may determine a friend of the user has a birthday, which may be a triggering event 110 for a "campaign" notification regarding the birthday to be sent to a friend of the user.

In particular embodiments, recipients 120 may include a particular user associated with the triggering event or other users that have a relationship to the particular user, as described below. For each recipient 120, there may be multiple notifications to provide and each notification may be sent to different delivery channels that include a communication media 144A-E that each has a unique endpoint 142A-D. Each layer or component of the notification workflow (e.g., triggering event 110, recipient 120, or notification type 130) may have one or more associated notification policies with a respective threshold, as described below. In particular embodiments, notifications may be associated with a particular notification type 130 (e.g., friend post, people you may know (PYMK), trending topic, etc.). The notifications policies may be configured to determine whether a notification policy is applied and the parameters of the notification policy may be modified, as described below.

In particular embodiments, the notification workflow may be initiated by a triggering event 110 (e.g., activity on a social-networking system with regard to the user) that may cause notifications to be sent to one or more recipients 120 (e.g., the user or friends of the user). For each recipient 120, there may be multiple notifications to provide and the notifications may be sent to different communication media 144A-E that each has an associated endpoint 142A-D. Example communication media 144A-E may include SMS, MMS, e-mail, particular application, or voice. Example endpoints may include a telephone number, an e-mail address, a particular client device as specified by a unique device identifier, a particular user account for the particular application or for the client device. In particular embodiments, one or more endpoints (e.g., 142B-C) may include additional identifying information 150A-B (e.g., a token or carrier information).

Figure 2:
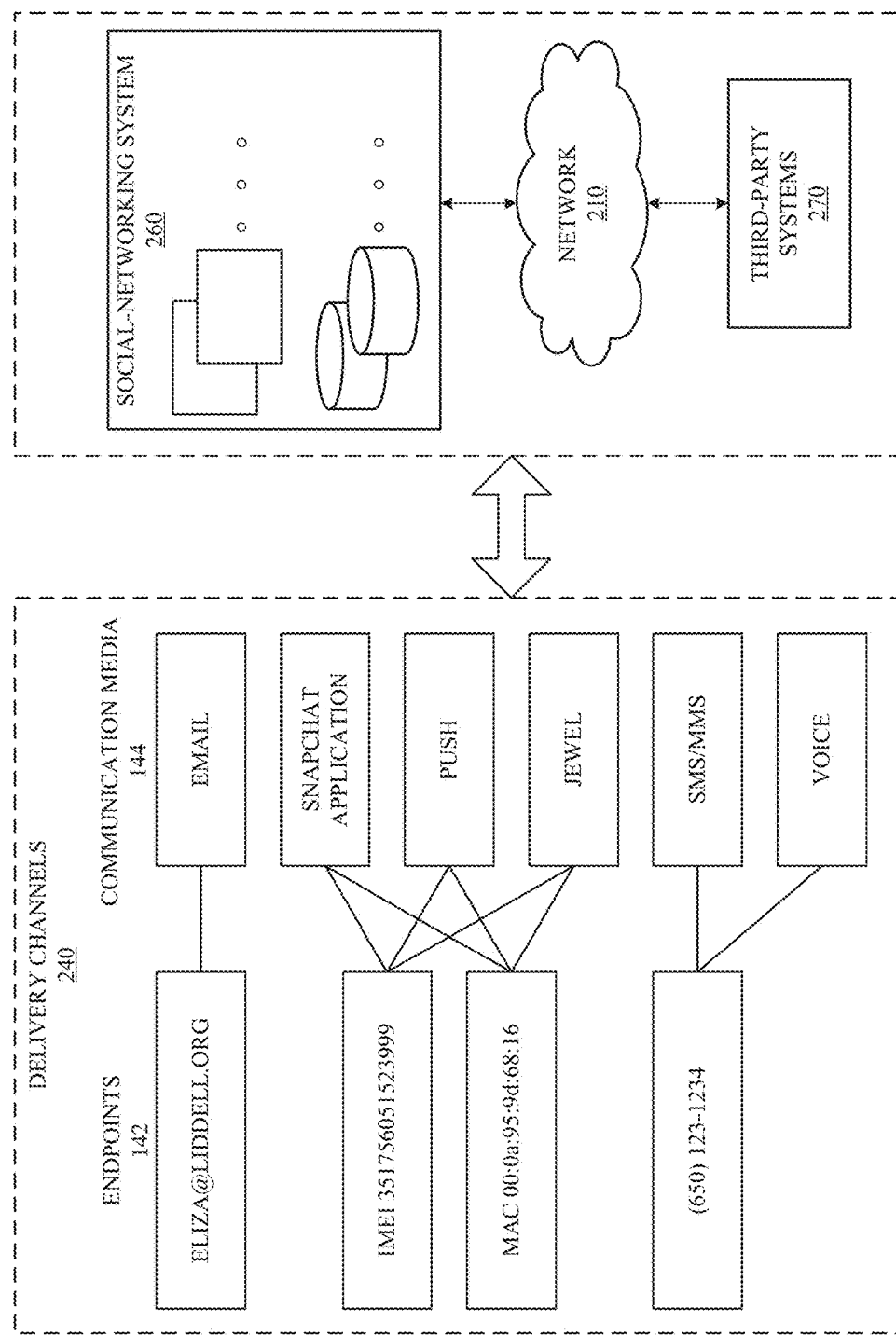
FIG. 2 illustrates an example architecture for delivering notifications to a user.

FIG. 2 illustrates an example architecture for delivering notifications to a user. A notification provider may include social-networking system 260, third-party system 270, or other suitable system that may provide notification content to be delivered by a notification-providing system. In one example embodiment described herein, elements of the notification-providing system may be implemented as part of social-networking system 260, and the notification-providing system may handle delivery of notifications generated by third-party systems 270 as well as by social-networking system 260. In particular embodiments, elements of the notification-providing system may be implemented as part of third-party system 270.

As shown in FIG. 2, notifications may be delivered by way of a number of communication channels 240. As discussed above, communication channel 240 may include one or more uniquely-identified endpoints 142 and one or more communication media 144. As illustrated in FIG. 2, notifications may be delivered by one or more communication media 144 (e.g., SMS, MMS, e-mail, particular application, voice, Jewel, push) to one or more unique endpoints 142 (e.g., a telephone number, an e-mail address, a particular client device as specified by a unique device identifier, a particular user account for the particular application or for the client device). In some embodiments, a particular communication medium 144 may be able to deliver a notification to more than one endpoint—for example, a third-party application such as SNAPCHAT (communication media 144) may be installed on the user's smartphone client device (first endpoint) and also on the user's laptop (second endpoint). Communication media 144 may be a push-type medium, such as SMS or e-mail, or it may be a pull-type medium, such as a newsfeed.

In particular embodiments, the notification-providing system may select different communication channels 240 for notifications based on the user's available communication channels 240 and the status thereof. As discussed above, the information about the user's available communication channels 240 may be retrieved from a registration data logger or store (e.g., information to enable the notification-providing system to deliver the notification to a SNAPCHAT application). The notification-providing system may also select communication channels or endpoint options for notifications based on the user's current delivery context, which may include device status. For example, if a user just checked in at a movie theater with her friends, then delivery of any notifications may be delayed or a notification dimension of an endpoint 142 may be configured to deliver notifications to her smartphone in "Silent" or "Vibrate" mode until movement detected by the phone indicates that she is exiting the theater. The notification-providing system may also choose to "escalate" a notification from a lower-ranked notification channel (e.g., newsfeed) to a higher-ranked communication channel (e.g., SMS) when delivering a particular type of notification or notifications with particular content based on one or more notification policies.

Figure 3:
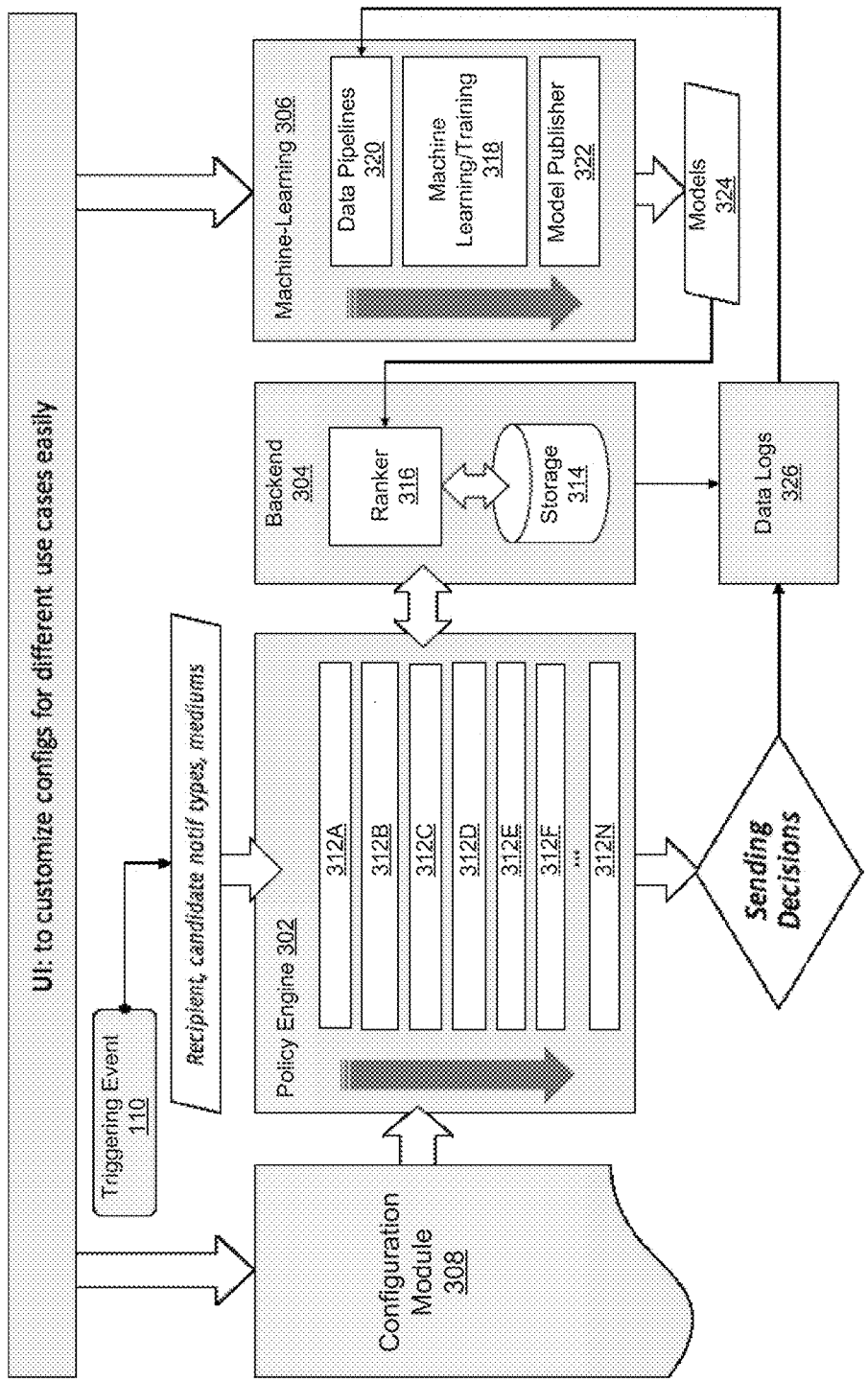
FIG. 3 illustrates an example architecture of a notification-providing system.

FIG. 3 illustrates an example architecture of a notification-providing system. As described above, notification provider (e.g., social-networking system 260 or third-party system 270) may provide notifications to the notification-providing system for delivery to endpoints of the user. In particular embodiments, notifications may include information of activities that are socially relevant to the user. As an example and not by way of limitation, notifications of activities on the social-networking system 260 may include content of posts from friends of the user, friend requests, activities on third-party applications affiliated with social-networking system 260, or comments on posts of the user. The notification-providing system, illustrated in FIG. 3, includes a policy engine 302, notification-backend engine 304, and notification-machine-learning engine 306. The notification-providing system may also include a configuration module 308 and a data-logging module 326. In particular embodiments, configuration module 308 may include components to configure notification polices 312A-N and may be customized for a particular use case or user. In particular embodiments, notification-backend engine 304 may include history storage 314 and a notification ranker 316. Notification-machine-learning engine 306 may include data pipelines 320 and a machine-learning module 318.

As described above, trigger event 110 may be a result of events or signals from multiple sources (e.g., multiple applications). For example, an action performed on a messaging application may trigger a notification being sent to an endpoint of the user from a social-networking application. In particular embodiments, logic associated with policy engine 302 of the notification-providing system may have access to models 324 for multiple applications.

As described below, policy engine 302 may include a number of notification policies 312A-N that are algorithms related to a particular aspect of whether a particular notification is sent to a user (e.g., user eligibility, a maximum number of notifications sent to a particular user, user preferences, communication-medium selection, or endpoint selection) and the notification policies 312A-N are executed by policy engine 302. Notifications may be sent to the user based on an output of a number of interrelated notification policies, as described below.

In particular embodiments, at least one of notification policies 312A-N associated with a first component (e.g., recipients) may be interrelated with at least one other notification policy 312A-N associated with a second component (e.g., notification type). Notifications may be targeted to the same user, yet delivered differently based on notification policies 312A-N. As an example and not by way of limitation, the difference in delivery of notifications may be due to differences in the current context, the user's social-networking information relating to the content of the notification, the user's past history of interacting with notifications sent by a particular source, etc. In particular embodiments, policy engine 302 may assess information associated with the notification (e.g., the source, content, type, or format) through one or more data logs 320, and apply the information to notification policies 312A-N. Such information may be provided within the content of notifications or as associated metadata. In particular embodiments, policy engine 302 may also assess information or features associated with a particular user (e.g., demographic information for the user, the user's location, the user's available communication channels 240 and the status thereof, the user's current delivery context, user profile information, or social-networking information for the user) from one or more data logs 326. The information described above, may be mapped to a feature vector for use by machine learning module 318.

Information or features such as the demographic information for the user, user profile information, or social-networking information for the user may be retrieved as user data and social data. Information about the user's current delivery context may be retrieved as context data—this category of information may cover any aspect of the user's current delivery context, such as, by way of example and not limitation: information about: a location of the user, a calendar associated with the user, an indicated status of the user, a scheduled event associated with the location, a trajectory of the user, a device status of one or more client devices associated with the user, or the user's current location with respect to other users with whom the user is connected in their social network. In particular embodiments, notifications may be sent to the user based on a threshold value associated with the notification policies 312A-N.

In particular embodiments, one or more notification policies 312A-N within the same layer (e.g., communication media) may be interrelated with each other. An output of one or more notification policies 312A-N associated with a respective application may be provided as an input to one or more notification policies 312A-N associated with another respective application. As an example and not by way of limitation, notification policy 312C may be associated with a messaging application and notification policy 312D may be associated with a social-networking application. A first user may use the messaging application to share a news article with a group of friends, which may act as a triggering event 110 for one or more notifications to be sent to a second user. Policy engine 202 may receive information associated with the first user sharing the news article, such as for example candidate recipients, notification types, or communication media for generating candidate notifications.

As the information is propagated to notification policy 312C associated with the messaging application, an output of notification policy 312C may indicate that a notification regarding the sharing of the news article by the first user should be sent to the second user (e.g., push notification). In particular embodiments, this output from notification policy 312C may be an input to notification policy 312D associated with a social-networking application. Based on candidate recipients 120, notification types 130, or communication media 142A-D associated with the first user sharing a news article with a group of friends, and additionally the output from notification policy 312C, a notification associated with the social-networking application may be generated in response to an output of notification policy 312D (e.g., through Jewel of the social-networking application). In particular embodiments, policy engine 302 may calculate a notification score based on the output of one or more of the notification policies 312A-N. Although this disclosure describes the interrelationship between particular communication media, this disclosure contemplates an interrelationship between any suitable types of notification policies 312A-N, notification types 130, recipients 120, communication media 144A-E, or any combination thereof.

As described above, notification-machine-learning engine 306 may include data pipelines 320 and a machine-learning module 318. Data pipelines 320 may access data from all layers (e.g., recipients, notification type, channel, etc.) from data logs 326. In particular embodiments, data pipelines 320 may also retrieve historical notification information about a user's responses to past notifications (e.g., conversion rates or click-through rates (CTR) for different notification/context/type/content/delivery patterns) and about prior context/delivery patterns (if any) for candidate notification or components, as well as interaction levels, rankings, or other suitable scoring, if any, based on those prior context/type/content/delivery patterns from history service.

In particular embodiments, machine-learning module 318 may use a machine-learning (ML) trained classifier to optimize a predictor function or model 324. Models 324 may determine whether to send one or more notifications to a particular recipient 120, the types of notifications 130 that will most likely result in the recipient 120 positively responding to the notification, or which communication media 142A-D should be used to send the notifications. Classification may be performed using the predictor function or model 324 that is constructed using a set of "training" data that includes an input vector and an answer vector. The feature vector may map values of features (e.g., candidate recipients, types of notifications, demographics, location, interests), described above, for a particular notification to a n-dimensional feature vector. The answer vector may be a vector of the result of the notification (e.g., whether or not a recipient viewed or dismissed the notification). The learned association of the machine-learning classifier may be used to optimize a set of weights of models 324.

Machine-learning module 318 may receive data from all notification layers (e.g., recipients, notification type, channel, etc.) through data pipelines 320. The data from data pipelines 320 may be used to train the ML classifier and generate models 324. In particular embodiments, machine-learning module 318 may take into account events or signals from multiple sources (e.g., multiple applications). The feature vector may map features associated with these candidate notifications (e.g., recipients, type of notification, or communication media). Machine-learning module 318 may generate one or more models 324 about the candidate notifications (e.g., particular endpoints or number of notifications). In particular embodiments, features from different applications (e.g., messaging or social-networking applications) or user behavior across different applications may be considered for optimization of different goals across multiple applications. As an example and not by way of limitation, a global budget regarding a total number of notifications sent to users across multiple applications may be globally set. The output of machine-learning module 318 may be stored in model publisher 322. Furthermore, machine-learning module 318 may update model 324 about sending a notification based on information not used to make a prior prediction (e.g., information received after the prior prediction was made).

In particular embodiments, notification policies 312A-N and their associated thresholds may be customized for a particular user through configuration module 308. As an example and not by of limitation, the value of weights associated with notification policies 312A-N may be customized on a per-user basis. For example, notification policies 312A-N or components (e.g., weights) of notification policies 312A-N may be modified for users based on one or more criteria (e.g., gender of the user or country of residence). One or more notification policies 312A-N may be modified for users residing in particular countries or locations may be filtered to remove references that are sensitive or offensive subject matter to those particular users.

As described above, notification-backend engine 304 may include history storage 314 and a notification ranker 316. Types of notifications and particular endpoints to receive the notifications may be determined by policy engine 302 based on a respective conversation rate for the type of notification on a particular endpoint. In particular embodiments, the notification score of the candidate notifications may be provided to notification ranker 316. Notification ranker 316 may rank the candidate notifications in accordance with the respective value of the notification score. The notification score may be based at least in part on the values of the features for particular notifications. The top-ranked candidate notifications may be identified to determine which of the top-ranked notifications should be sent. In particular embodiments, the candidate notifications are identified based on the notification score calculated using model 324 for a particular user being above a pre-determined threshold value. Data identifying the top-ranked candidate notifications may be provided by ranker 316 to policy engine 302. The subsequent response by the user to the notification may be logged on history storage 314.

In particular embodiments, one or more endpoint options may be configured based on one or more notification policies 312A-N. As an example and not by way of limitation, notifications may be displayed in the system tray of a computing device or lock screen of a mobile device based on notification policies 312A-N. As another example, a notification dimension of an endpoint (e.g., vibration, flashing light, sound, or any combination thereof) may be configured for different types of notifications based on notification policies 312A-N. In particular embodiments, the subscription level of a notification sent on one channel (e.g., 142A) may be affected by the disabling/enabling of another channel (e.g., 142B). Once policy engine 302 has considered the relevant factors applied to notification policies 312A-N, a notification-delivery service may handle formatting and delivering notifications in accordance with the context/delivery pattern specified in notification policies 312A-N.

Figure 4:
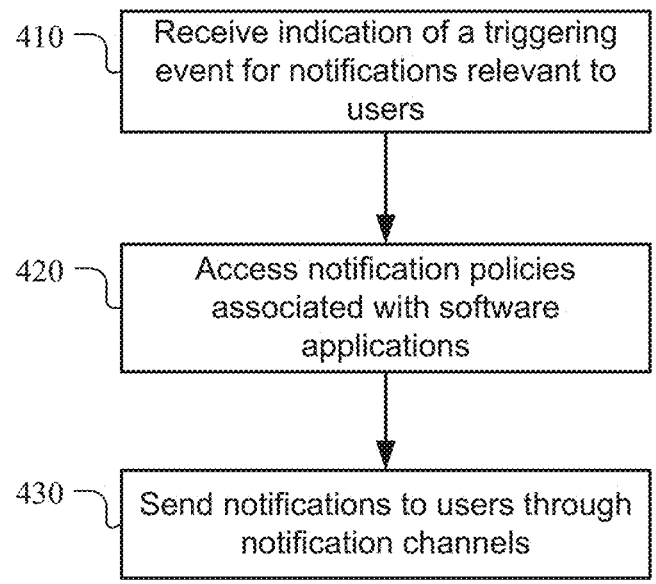
FIG. 4 illustrates an example method for sending notifications based one or more interrelated notification policies.

FIG. 4 illustrates an example method 400 for sending notifications based one or more interrelated notification policies. The method may begin at step 410, where one or more computing devices receive an indication of an occurrence of a triggering event for one or more notifications relevant to one or more users. In particular embodiments, the notifications are sent to one or more of the users through one or more of a number of notification channels, and each notification channel is associated with one or more software applications. At step 420, one or more computing devices accesses a number of notification policies associated with the software applications. Each of the software applications has at least one associated notification policy. In particular embodiments, at least one of the notification policies associated with a first one of the software applications is interrelated with at least one other notification policy associated with a second one of the software applications. At step 430, one or more computing devices send one or more notifications to one or more users through one or more of the notification channels based at least in part on the output of one or more interrelated notification policies. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for sending notifications based one or more interrelated notification policies including the particular steps of the method of FIG. 4, this disclosure contemplates any suitable method for sending notifications based one or more interrelated notification policies including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
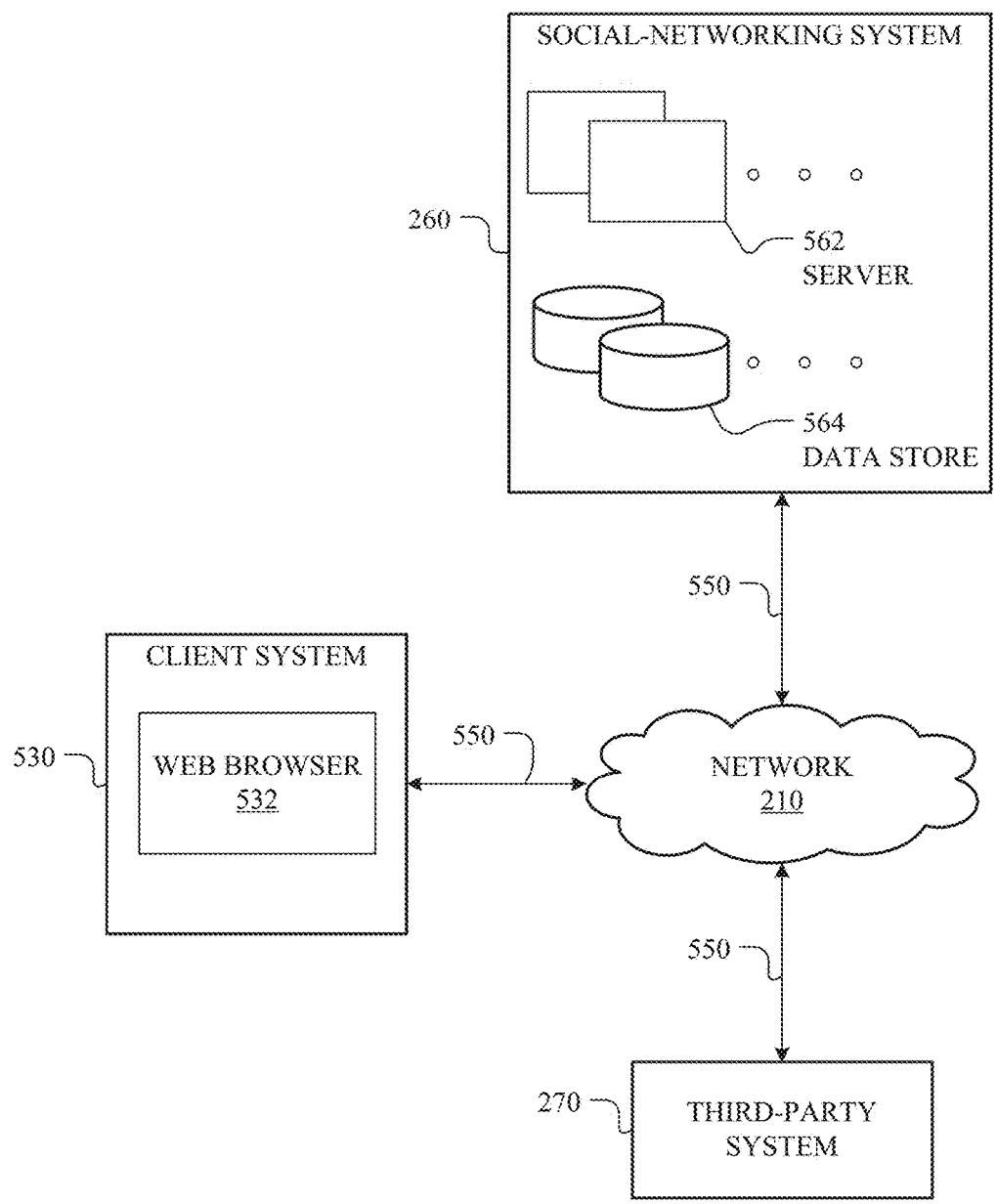
FIG. 5 illustrates an example network environment associated with a social-networking system.

FIG. 5 illustrates an example network environment 500 associated with a social-networking system. Network environment 500 includes a client system 530, a social-networking system 260, and a third-party system 270 connected to each other by a network 210. Although FIG. 5 illustrates a particular arrangement of client system 530, social-networking system 260, third-party system 270, and network 210, this disclosure contemplates any suitable arrangement of client system 530, social-networking system 560, third-party system 570, and network 210. As an example and not by way of limitation, two or more of client system 530, social-networking system 260, and third-party system 270 may be connected to each other directly, bypassing network 210. As another example, two or more of client system 530, social-networking system 560, and third-party system 570 may be physically or logically co-located with each other in whole or in part. Moreover, although FIG. 5 illustrates a particular number of client systems 530, social-networking systems 260, third-party systems 270, and networks 210, this disclosure contemplates any suitable number of client systems 530, social-networking systems 260, third-party systems 270, and networks 210. As an example and not by way of limitation, network environment 500 may include multiple client system 530, social-networking systems 560, third-party systems 570, and networks 210.

This disclosure contemplates any suitable network 210. As an example and not by way of limitation, one or more portions of network 210 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 210 may include one or more networks 210.

Links 550 may connect client system 530, social-networking system 260, and third-party system 270 to communication network 210 or to each other. This disclosure contemplates any suitable links 550. In particular embodiments, one or more links 550 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 210. A client system 530 may enable its user to communicate with other users at other client systems 530.

In particular embodiments, client system 530 may include a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 260 may be a network-addressable computing system that can host an online social network. Social-networking system 260 may generate, store, receive, and send social-networking data, such as, for example, user-profile data, concept-profile data, social-graph information, or other suitable data related to the online social network. Social-networking system 260 may be accessed by the other components of network environment 500 either directly or via network 210. As an example and not by way of limitation, client system 530 may access social-networking system 260 using a web browser 532, or a native application associated with social-networking system 260 (e.g., a mobile social-networking application, a messaging application, another suitable application, or any combination thereof) either directly or via network 210. In particular embodiments, social-networking system 260 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 260 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 260, or a third-party system 270 to manage, retrieve, modify, add, or delete, the information stored in data store 564.

In particular embodiments, social-networking system 260 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 260 may provide users of the online social network the ability to communicate and interact with other users. In particular embodiments, users may join the online social network via social-networking system 260 and then add connections (e.g., relationships) to a number of other users of social-networking system 260 to whom they want to be connected. Herein, the term "friend" may refer to any other user of social-networking system 260 with whom a user has formed a connection, association, or relationship via social-networking system 260.

In particular embodiments, social-networking system 260 may provide users with the ability to take actions on various types of items or objects, supported by social-networking system 260. As an example and not by way of limitation, the items and objects may include groups or social networks to which users of social-networking system 260 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 260 or by an external system of third-party system 270, which is separate from social-networking system 260 and coupled to social-networking system 260 via a network 210.

In particular embodiments, social-networking system 260 may be capable of linking a variety of entities. As an example and not by way of limitation, social-networking system 260 may enable users to interact with each other as well as receive content from third-party systems 270 or other entities, or to allow users to interact with these entities through an application programming interfaces (API) or other communication channels.

In particular embodiments, a third-party system 270 may include one or more types of servers, one or more data stores, one or more interfaces, including but not limited to APIs, one or more web services, one or more content sources, one or more networks, or any other suitable components, e.g., that servers may communicate with. A third-party system 270 may be operated by a different entity from an entity operating social-networking system 260. In particular embodiments, however, social-networking system 260 and third-party systems 270 may operate in conjunction with each other to provide social-networking services to users of social-networking system 260 or third-party systems 270. In this sense, social-networking system 260 may provide a platform, or backbone, which other systems, such as third-party systems 270, may use to provide social-networking services and functionality to users across the Internet.

In particular embodiments, a third-party system 270 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 260 also includes user-generated content objects, which may enhance a user's interactions with social-networking system 260. User-generated content may include anything a user can add, upload, send, or "post" to social-networking system 260. As an example and not by way of limitation, a user communicates posts to social-networking system 260 from a client system 530. Posts may include data such as status updates or other textual data, location information, photos, videos, links, music or other similar data or media. Content may also be added to social-networking system 260 by a third-party through a "communication channel," such as a newsfeed or stream.

In particular embodiments, social-networking system 260 may include a variety of servers, sub-systems, programs, modules, logs, and data stores. In particular embodiments, social-networking system 260 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 260 may also include suitable components such as network interfaces, security mechanisms, load balancers, failover servers, management-and-network-operations consoles, other suitable components, or any suitable combination thereof. In particular embodiments, social-networking system 260 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 260 to one or more client systems 530 or one or more third-party system 270 via network 210. The web server may include a mail server or other messaging functionality for receiving and routing messages between social-networking system 260 and one or more client systems 530. An API-request server may allow a third-party system 270 to access information from social-networking system 260 by calling one or more APIs. An action logger may be used to receive communications from a web server about a user's actions on or off social-networking system 260. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 260. A privacy setting of a user determines how particular information associated with a user can be shared. The authorization server may allow users to opt in to or opt out of having their actions logged by social-networking system 260 or shared with other systems (e.g., third-party system 270), such as, for example, by setting appropriate privacy settings. Third-party-content-object stores may be used to store content objects received from third parties, such as a third-party system 270. Location stores may be used for storing location information received from client systems 530 associated with users. Advertisement-pricing modules may combine social information, the current time, location information, or other suitable information to provide relevant advertisements, in the form of notifications, to a user.

Figure 6:
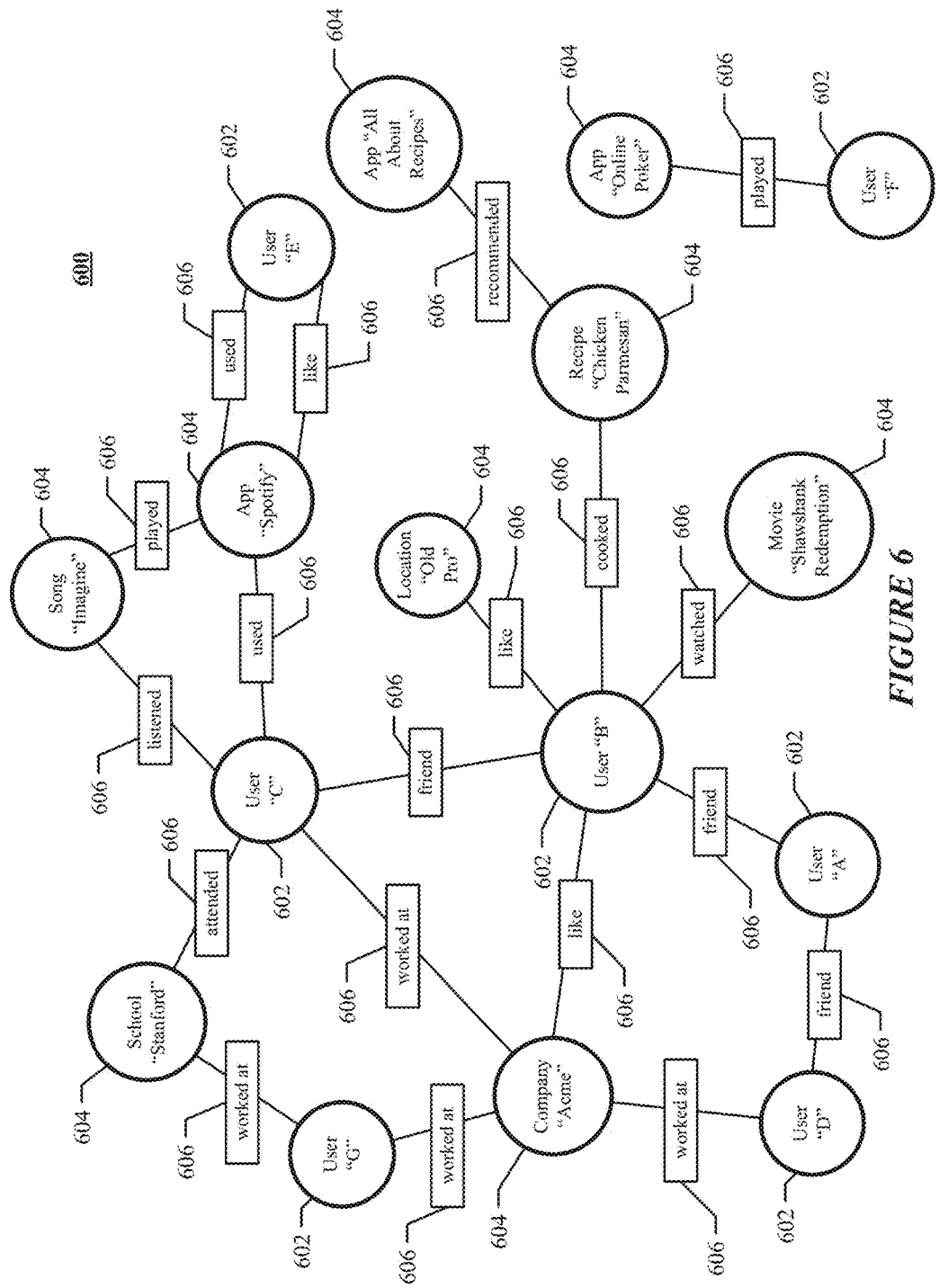
FIG. 6 illustrates an example social graph.

FIG. 6 illustrates example social graph 600. In particular embodiments, social-networking system 260 may store one or more social graphs 600 in one or more data stores. In particular embodiments, social graph 600 may include multiple nodes—which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a social-networking system 260, client system 130, or third-party system 270 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 260. As an example and not by way of limitation, a user may be an individual (human user), an entity (e.g., an enterprise, business, or third-party application), or a group (e.g., of individuals or entities) that interacts or communicates with or over social-networking system 260. In particular embodiments, when a user registers for an account with social-networking system 260, social-networking system 260 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 260. In particular embodiments, a user node 602 may be associated with information provided by a user or information gathered by various systems, including social-networking system 260. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 260 or a third-party website associated with a web-application server); an entity (such as, for example, a person, business, group, sports team, or celebrity); a resource (such as, for example, an audio file, video file, digital photo, text file, structured document, or application) which may be located within social-networking system 260 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 260. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 260.

Profile pages may also be hosted on third-party websites associated with a third-party system 270. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 270. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 260 a message indicating the user's action. In response to the message, social-networking system 260 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 260 may send a "friend request" to the second user. If the second user confirms the "friend request," social-networking system 260 may create an edge 606 connecting the first user's user node 602 to the second user's user node 602 in social graph 600 and store edge 606 as social-graph information in one or more of data stores 564. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 260 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 260 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 260 may create a "played" edge 606 (as illustrated in FIG. 6) between concept nodes 604 corresponding to the song and the application to indicate that the particular song was played by the particular application. In this case, "played" edge 606 corresponds to an action performed by an external application (SPOTIFY) on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604 for "SPOTIFY").

In particular embodiments, social-networking system 260 may create an edge 606 between a user node 602 and a concept node 604 in social graph 600. As an example and not by way of limitation, a user viewing a concept-profile page (such as, for example, by using a web browser or a special-purpose application hosted by the user's client system 130) may indicate that he or she likes the concept represented by the concept node 604 by clicking or selecting a "Like" icon, which may cause the user's client system 530 to send to social-networking system 260 a message indicating the user's liking of the concept associated with the concept-profile page. In response to the message, social-networking system 260 may create an edge 606 between user node 602 associated with the user and concept node 604, as illustrated by "like" edge 606 between the user and concept node 604. In particular embodiments, social-networking system 260 may store an edge 606 in one or more data stores. In particular embodiments, an edge 606 may be automatically formed by social-networking system 260 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

In particular embodiments, social-networking system 260 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 270 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 260 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 260 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 260 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 260 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 260 may calculate a coefficient based on a user's actions. Social-networking system 260 may monitor such actions on the online social network, on a third-party system 270, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 260 may calculate a coefficient based on the user's actions with particular types of content. The content may be associated with the online social network, a third-party system 270, or another suitable system. The content may include users, profile pages, posts, news stories, headlines, instant messages, chat room conversations, emails, advertisements, pictures, video, music, other suitable objects, or any combination thereof. Social-networking system 260 may analyze a user's actions to determine whether one or more of the actions indicate an affinity for subject matter, content, other users, and so forth. As an example and not by way of limitation, if a user frequently posts content related to "coffee" or variants thereof, social-networking system 260 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 260 may calculate a coefficient based on the type of relationship between particular objects. Referencing the social graph 600, social-networking system 260 may analyze the number and/or type of edges #06 connecting particular user nodes 602 and concept nodes 604 when calculating a coefficient. As an example and not by way of limitation, user nodes 602 that are connected by a spouse-type edge (representing that the two users are married) may be assigned a higher coefficient than a user nodes 602 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 260 may determine that the user has a higher coefficient with respect to the first photo than the second photo because having a tagged-in-type relationship with content may be assigned a higher weight and/or rating than having a like-type relationship with content. In particular embodiments, social-networking system 260 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 260 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 600. As an example and not by way of limitation, social-graph entities that are closer in the social graph 600 (i.e., fewer degrees of separation) may have a higher coefficient than entities that are further apart in the social graph 600.

In particular embodiments, social-networking system 260 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 260 may determine that the user has a higher coefficient for the airport than the gas station based on the proximity of the airport to the user.

In particular embodiments, social-networking system 260 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 260 may provide information that is relevant to user's interests and current circumstances, increasing the likelihood that they will find such information of interest. In particular embodiments, social-networking system 260 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 260 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 260 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 270 (e.g., via an API or other communication channel), or from another suitable system. In response to the request, social-networking system 260 may calculate the coefficient (or access the coefficient information if it has previously been calculated and stored). In particular embodiments, social-networking system 260 may measure an affinity with respect to a particular process. Different processes (both internal and external to the online social network) may request a coefficient for a particular object or set of objects. Social-networking system 260 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 260). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 260. In addition or as an alternative, the social action may be promoted outside or off of social-networking system 260, where appropriate. In particular embodiments, a page may be an on-line presence (such as a webpage or website within or outside of social-networking system 260) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 260. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 260) or RSVP (e.g., through social-networking system 260) to an event associated with the advertisement. In addition or as an alternative, an advertisement may include social-networking-system content directed to the user. For example, an advertisement may display information about a friend of the user within social-networking system 260 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 260 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 260.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 260 to identify those users. In addition or as an alternative, social-networking system 260 may use user-profile information in social-networking system 260 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 260, off or outside of social-networking system 260, or on mobile computing devices of users. When on or within social-networking system 260, such targeting may be directed to users' news feeds, search results, e-mail or other in-boxes, or notifications channels or may appear in particular area of web pages of social-networking system 260, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 260, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 260 or explicit connections of a user to a node, object, entity, brand, or page on social-networking system 260. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 604 corresponding to a particular photo may have a privacy setting specifying that the photo may only be accessed by users tagged in the photo and their friends. In particular embodiments, privacy settings may allow users to opt in or opt out of having their actions logged by social-networking system 260 or shared with other systems (e.g., third-party system 270). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 270, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 562 may be authorization/privacy servers for enforcing privacy settings. In response to a request from a user (or other entity) for a particular object stored in a data store 564, social-networking system 560 may send a request to the data store 564 for the object. The request may identify the user associated with the request and may only be sent to the user (or a client system 530 of the user) if the authorization server determines that the user is authorized to access the object based on the privacy settings associated with the object. If the requesting user is not authorized to access the object, the authorization server may prevent the requested object from being retrieved from the data store 564, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 7:
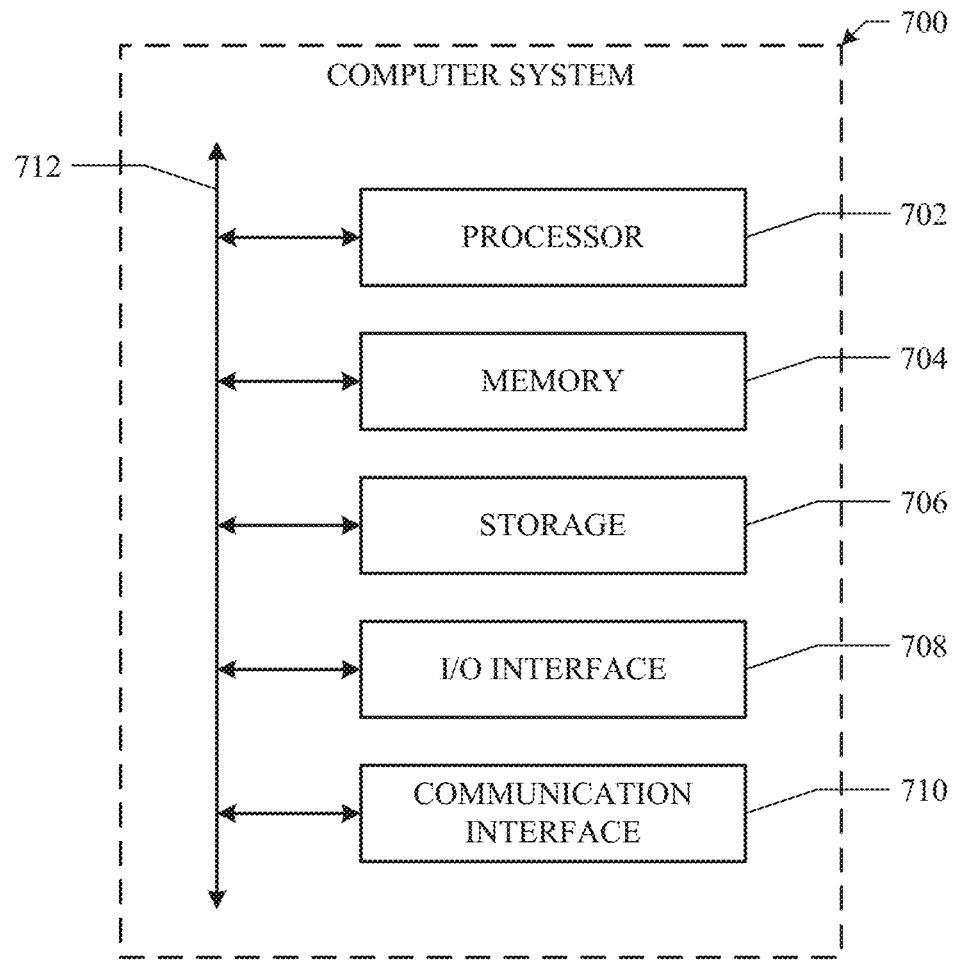
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by one or more computing devices, receiving an indication of an occurrence of a triggering event for one or more notifications of user-generated content relevant to one or more users, wherein the notifications are sent to one or more of the users through one or more of a plurality of notification channels, and wherein each notification channel is associated with one or more software applications;
    by one or more computing devices, accessing a plurality of notification policies associated with the software applications, wherein:
        each of the software applications has at least one associated notification policy;
        at least one of the notification policies associated with a first one of the software applications is interrelated with at least one other notification policy associated with a second one of the software applications;
    by one or more computing devices, applying a feature vector corresponding to one or more of the users to a machine-learning (ML) model, wherein the ML model is based on click-through rates (CTR) of the one or more users with regard to a type associated with one or more of the notifications; and
    by one or more computing devices, sending one or more notifications to one or more users through one or more of the plurality of notification channels based at least in part on the output of one or more interrelated notification policies and the ML model.

2. The method of claim 1, wherein the interrelationship comprises an output of at least one of notification policies associated with the first one of the software applications provides an input to at least one other notification policy associated with the second one of the software applications.

3. The method of claim 1, further comprising:
    accessing data of previous interactions by the user with regard to the first one and second one of the software applications; and
    determining a modification to the first one or second one of the software applications based at least in part on the accessed data.

4. The method of claim 3, wherein determining one or more of the modifications comprises applying a machine-learning algorithm to the data of previous interactions by the user with regard to the first one or second one of the software applications.

5. The method of claim 1, wherein:
each notification channel comprises a plurality of notification policies associated with a plurality of components;
each of the components has at least one associated notification policy; and
at least one of the notification policies associated with a first one of the components is interrelated with at least one other notification policy associated with a second one of the categories.

6. The method of claim 1, wherein each of the sent notifications has a notification score higher than the threshold value of the respective notification policy.

7. The method of claim 1, further comprising ranking the notifications based at least in part on the notification score.

8. One or more computer-readable non-transitory storage media embodying software that is operable when executed to:
receive an indication of an occurrence of a triggering event for one or more notifications of user-generated content relevant to one or more users, wherein the notifications are sent to one or more of the users through one or more of a plurality of notification channels, and wherein each notification channel is associated with one or more software applications;
access a plurality of notification policies associated with the software applications, wherein:
each of the software applications has at least one associated notification policy;
at least one of the notification policies associated with a first one of the software applications is interrelated with at least one other notification policy associated with a second one of the software applications;
apply a feature vector corresponding to one or more of the users to a machine-learning (ML) model, wherein the ML model is based on click-through rates (CTR) of the one or more users with regard to a type associated with one or more of the notifications; and
send one or more notifications to one or more users through one or more of the plurality of notification channels based at least in part on the output of one or more interrelated notification policies and the ML model.

9. The media of claim 8, wherein the interrelationship comprises an output of at least one of notification policies associated with the first one of the software applications provides an input to at least one other notification policy associated with the second one of the software applications.

10. The media of claim 8, wherein the software is further operable to:
access data of previous interactions by the user with regard to the first one and second one of the software applications; and
determine a modification to the first one or second one of the software applications based at least in part on the accessed data.

11. The media of claim 10, wherein the software is further operable to apply a machine-learning algorithm to the data of previous interactions by the user with regard to the first one or second one of the software applications.

12. The media of claim 8, wherein:
each notification channel comprises a plurality of notification policies associated with a plurality of components;
each of the components has at least one associated notification policy; and
at least one of the notification policies associated with a first one of the components is interrelated with at least one other notification policy associated with a second one of the components.

13. The media of claim 8, wherein each of the sent notifications has a score higher than the threshold value of the respective notification policy.

14. The media of claim 8, wherein the software is further operable to rank the notifications based at least in part on the notification score.

15. A system comprising: one or more processors; and a memory coupled to the processors comprising instructions executable by the processors, the processors being operable when executing the instructions to:
receive an indication of an occurrence of a triggering event for one or more notifications of user-generated content relevant to one or more users, wherein the notifications are sent to one or more of the users through one or more of a plurality of notification channels, and wherein each notification channel is associated with one or more software applications;
access a plurality of notification policies associated with the software applications, wherein:
each of the software applications has at least one associated notification policy;
at least one of the notification policies associated with a first one of the software applications is interrelated with at least one other notification policy associated with a second one of the software applications;
apply a feature vector corresponding to one or more of the users to a machine-learning (ML) model, wherein the ML model is based on click-through rates (CTR) of the one or more users with regard to a type associated with one or more of the notifications; and
send one or more notifications to one or more users through one or more of the plurality of notification channels based at least in part on the output of one or more interrelated notification policies and the ML model.

16. The system of claim 15, wherein the interrelationship comprises an output of at least one of notification policies associated with the first one of the software applications provides an input to at least one other notification policy associated with the second one of the software applications.

17. The system of claim 15, wherein the processors are further operable to:
access data of previous interactions by the user with regard to the first one and second one of the software applications; and
determine a modification to the first one or second one of the software applications based at least in part on the accessed data.

18. The system of claim 17, wherein the processors are further operable to apply a machine-learning algorithm to the data of previous interactions by the user with regard to the first one or second one of the software applications.

19. The system of claim 15, wherein:
each notification channel comprises a plurality of notification policies associated with a plurality of components;
each of the components has at least one associated notification policy; and at least one of the notification policies associated with a first one of the components is interrelated with at least one other notification policy associated with a second one of the components.

20. The system of claim 15, wherein each of the sent notifications has a score higher than the threshold value of the respective notification policy.

* * * * *